United States Patent [19]
Levosinski et al.

[11] 3,744,924
[45] July 10, 1973

[54] DEFLECTABLE BORING QUILL

[75] Inventors: George J. Levosinski, Detroit; Joseph Mitkiewicz, Farmington, both of Mich.

[73] Assignee: Ex-Cell-O Corporation, Detroit, Mich.

[22] Filed: Mar. 29, 1972

[21] Appl. No.: 239,175

[52] U.S. Cl. .................................................. 408/156
[51] Int. Cl. B23d 77/06, B23b 51/00, B23b 29/034
[58] Field of Search ................... 408/147, 153, 154, 408/156

[56] References Cited
UNITED STATES PATENTS

| | | | |
|---|---|---|---|
| 2,040,225 | 5/1936 | Walther | 408/154 |
| 3,007,356 | 11/1961 | Jones | 408/147 |
| 3,296,898 | 1/1967 | Osborn | 408/156 |

*Primary Examiner*—Donald R. Schran
*Attorney*—James H. Bower

[57] ABSTRACT

A boring quill for use with a spindle having means provided for extending or retracting the cutting tool of the apparatus either automatically or semi-automatically, and additionally having means for varying the extended position of the cutting tool to compensate for tool wear.

11 Claims, 3 Drawing Figures

3,744,924

DEFLECTABLE BORING QUILL

BACKGROUND OF THE INVENTION

1. Field of the Invention.

The present invention relates to boring quills, and more particularly refers to such apparatus having means provided whereby the boring or cutting tool used in the apparatus may be retracted away from the surface of the workpiece before the apparatus is withdrawn or before the workpiece is withdrawn. Additionally, the present invention relates to apparatus of the type described having means provided whereby the positioning of the cutting tool may be separately adjusted to compensate for tool wear or to set the original size.

2. Description of the Prior Art.

Boring quills having means for retracting the cutting tool prior to removal and compensating for tool wear are known in the art. Various structures for accomplishing these ends utilize electromagnetic clutches, pressure rollers, various forms of double-acting cams and other means.

SUMMARY OF THE INVENTION

It is an object of the invention to provide a boring quill adapted to be mounted on a spindle of a boring apparatus, having means provided for retracting the boring tool radially after he boring operation has been finished, in order to avoid tool marks during the return stroke of the spindle.

It is a further object to provide a boring quill having means for providing controlled bi-directional radial motion of the cutting tool in order to adjust for size, or to compensate for wear, thus holding the dimension of the part within the desired size and tolerance limits.

It is an additional object to provide an apparatus of the type described wherein positioning of the cutter can be accomplished automatically or semi-automatically either while the spindle is running or when it has stopped.

It is additionally an object to provide apparatus of the type described which may also be used for turning operations where stationary tool holders are utilized operating on workpieces which rotate.

It is still an additional object to provide a boring quill of the type described wherein adjustment for tool wear may be accomplished independently of the adjustment for cutting tool retraction, and where such adjustment may be made with precision.

Still further objects and advantages of the invention will appear as the description proceeds.

According to the present invention, a boring quill is provided having a housing. A tool holder adapter 18 and a retainer 19 are mounted on a flexible diaphragm 15 which is supported within the housing 11, providing torsional or pivotable movement of the adapter 18 and retainer 19. A double-acting barrel-type can is mounted in a chamber provided in the cam housing 17. The cam has an axial taper with axial movement being provided by an operating draw bar to retract the cutting tool. The cam additionally has a uniform radial rise. Rotation of the cam is provided by a rotary dial which is coupled to the cam by means of gears or through the operating or draw bar. A cam pin engages the cam and transmits movement to the retainer which in turn moves the tool holder adapter. As a result of the arrangement, tool withdrawal or extension and wear compensation adjustments may be separately and precisely made.

To the accomplishment of the foregoing and related ends, the invention, then, consists of the improved boring quill herein fully described and particularly pointed out in the claims, the annexed drawings, and the following description setting forth in detail certain illustrative embodiments of the invention, such disclosed embodiments illustrating, however, but one of the various ways in which the principles of the invention may be used.

DESCRIPTION OF THE PREFERRED EMBODIMENT

Figure 1:
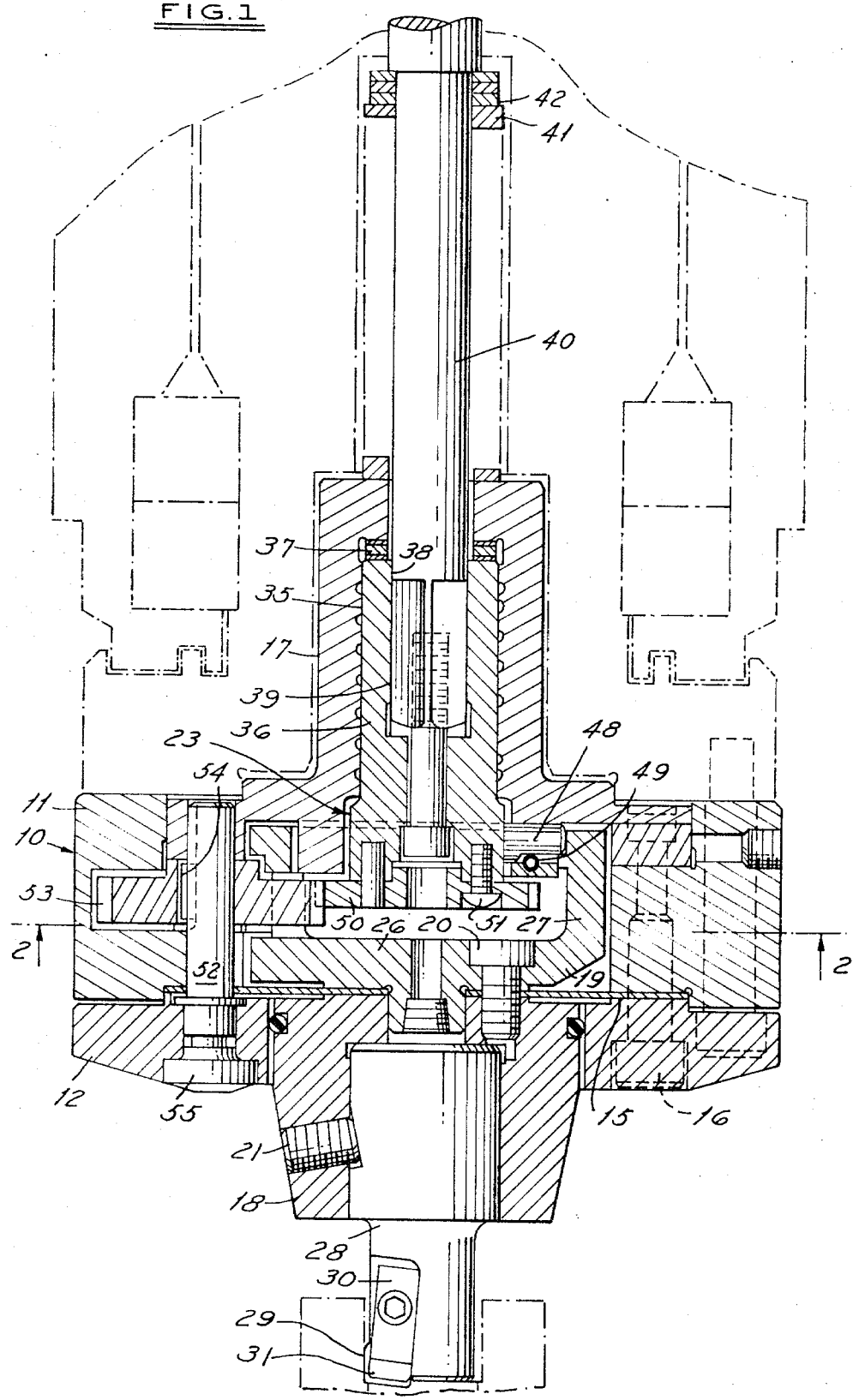
FIG. 1 is a sectional view of the apparatus, taken at the line 1—1 of FIG. 2, looking in the direction of the arrows.
Figure 2:
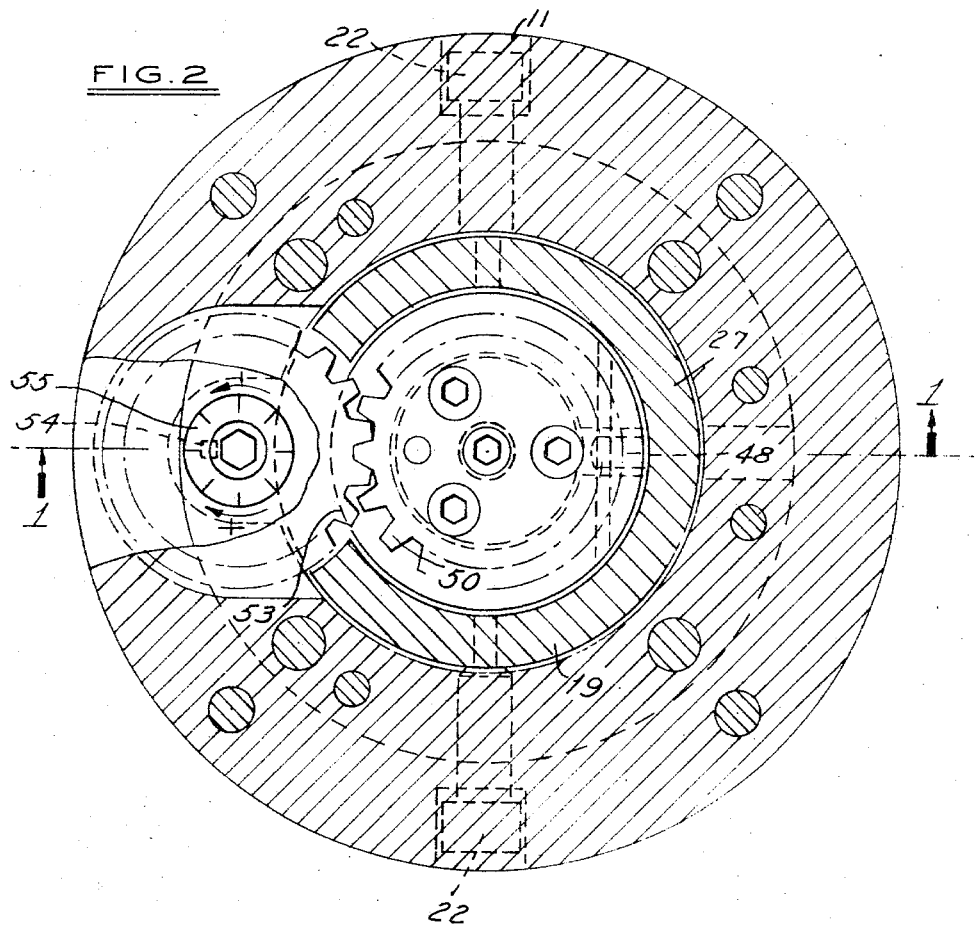
FIG. 2 is a partial cross-sectional view taken at the line 2—2 of FIG. 1, looking in the direction of the arrows.
Figure 3:
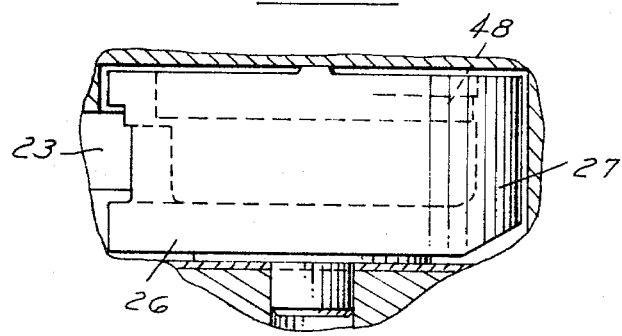
FIG. 3 is a fragmentary sectional view of the adapter shown in FIG. 1.

Referring to FIGS. 1 and 2, the boring quill 10 is shown comprising a body 11, a cap 12 affixed thereto. A flexible diaphragm 15 is mounted and retained intermediate the cap 12 and the body 11, the assembly being clamped together by melns of screws 16. The purpose of the diaphragm 15 is to carry and center the retainer 19 and the tool holder 18. Mounted at the rear of the body 11 is cylindrical cam housing 17.

Mounted on the central portion of the diaphragm are a tool support adapter 18 and a retainer 19 affixed together and to the diaphragm by means of screws 20. A set screw 21 is provided for retaining a cutting tool holder. The retainer 19 is in the form of a partial cup having a radial wall or bottom 26 and an axial wall 27. The upper portion of the axial wall is recessed to permit clearance of certain structures to be subsequently discussed. The structure is so arranged that in the normal rest position the adapter 18 and retainer 19 are coaxially aligned with the body 11. However, since the diaphragm is flexible, when a downward force is brought to bear on the lower axial wall 27 of the retainer, the structure twists or pivots until the axes are no longer coaxial with that of the body 11. Two retainer pins 22 bear on the outer diameter of the retainer 19 to prevent any sideward deflection.

A tool holder 28 is shown mounted in place in the adapter 18 and maintained in place by the setscrew 21. A cutting tool 29 is mounted and maintained in place on the tool holder by means of a clamp 30. The cutting tool has a cutting point 31. These are replaceable items designed to suit any given specific application.

As shown in FIG. 1, a cam chamber 35 is axially provided in the cam housing 11. A barrel-type cam 36 is mounted within the cam chamber and is free to move both axially and rotatably, the inner surface of the cam chamber 35 serving as a bearing therefor. The surface 23 of cam 36 is provided with both an axial taper and a uniform radial rise taper. The axial taper functions for causing the tool holder 28 to retract or extend radially. The radial taper provides tool wear compensation to maintain the cutting point of the tool in the proper position as the tool wears. The cam 36 engages a thrust bearing 37 to reduce friction. The cam is provided with an axial channel 38, a portion 39 of which has a square cross-section. An operating or draw bar 40 having a complementary square cross-section at its end is inserted in the axial channel 38 and affixed to the cam 36. A spring 41 and thrust bearing 42 are provided to maintain the operating bar in normally extended position. A cam pin 48 is slidably mounted in a radial hole of the housing 17. As shown in FIGS. 1 and 2, the outer end of the cam pin 48 is rounded and it engages the inner diameter of the axial wall 27 of the retainer 19, while the inner end is tapered to follow the tapered portion of the cam 36. A roll pin 49 is provided to limit axial travel of the cam pin 48 and to prevent it from rotating. The pin engages a notch (not shown) provided in the cam pin 48.

Rotation of the cam 36 may be accomplished by rotating the operating bar automatically through an external means, such as described by U.S. Pat. No. 3,620,131 or 3,620,132, or equivalent. This invention also includes a manual separate means for accomplishing this operation and comprises a spur gear 50 affixed to the cam 36 by means of screws 51. A shaft 52 is rotatably mounted in the body 11 and cap 12, and has a spur gear 53 mounted thereon and rotatably affixed by means of a key 54. The upper axial wall of the retainer 19 is recessed to clear the spur gears 50 and 53. Mounted on the outer end of the shaft 52 is a manual adjustment dial 55. The dial 55 is so positioned that it may be readily rotated by inserting a hexagonal key 57 (shown in FIG. 1 in dotted line) and rotated. The face of the dial may be arbitrarily graduated, or, alternatively may be provided with calibrated graduations denoting the degree of travel of the cutting tool.

The manual adjusting system just described is permanently engaged and thus serves as an internal indicator when operated automatically.

OPERATION

Operation of the quill assembly may be readily understood in reference to FIGS. 1 and 2. In the position shown, the cutting tool point 31 is in the normal cutting position removing metal from the inner diameter of a part. The operating bar 40 is in the normal rearward position, that is, to the right of the drawing of FIG. 1. In order to retract the cutting point 31 the operating bar 40 is moved axially inwardly, or toward the left of the drawing. The cam 36 which is attached to the operating bar 40 also is caused to move axially in the same direction. As the cam moves axially inwardly, the cam pin 48 is caused to move radially inwardly because of the axially tapered surface of the cam 36, and the force caused by the elastic memory of the deflected diaphragm 15, thereby centering the retainer-tool assembly. In the centered position the cutting point of the tool is spaced apart from the workpiece. Consequently, the tool 29 retracts radially by an amount determined by the relationship of the taper and stroke of the cam and by the length of the tool holder, both of which are constant for a given design and for a particular machining set-up.

In order to extend the cutting point 31 radially outwardly to contact the workpiece, the operating bar is moved radially outwardly, or to the right of the drawing. Since the cam 36 is attached to the bar, it will move toward the right also. The cam lobe is tapered from its outer end toward its inner end. As a result, when the cam move to the right the cam pin 48 is moved outward radially, pushing against the axial retainer wall 27. This causes the diaphragm 15 to be deflected or twisted and the adapter 18 pivots around its center position, thereby extending the cutting point 31 radially. Since the axial movement is constant, the tool bit always extends to the same radial position as determined by the taper of the cam 36, and by the length of the tool holder 28, all of which are constant for a given set-up. The tool is now in position to operate.

In order to achieve tool wear compensation by directional tool adjustment manually, a removable key 57 is inserted into the manual adjustment dial 55 and manually rotated the desired amount. This causes the spur gear 53 to rotate, in turn rotating the spur gear 50. The spur gear 50 is connected to the barrel-type cam and causes the cam to rotate. The cam surface is so figured, that in addition to its axial cam surface, it has a radial cam surface. When the cam is rotated clockwise, its uniform radial rise pushes against the cam pin 48 moving it radially outward with an increment proportional to the angular rotation of the cam. When the cam pin pushes against the retainer wall 27, this forces the diaphragm to deflect and the adapter 18 pivots about its center position. Consequently, the tool point 31 extends radially with a corresponding increment. Sidewise and axial movement are prevented by pins 22 and abutting face surfaces of the retainer 19 and the adapter 18.

When the cam 36 is rotated counterclockwise, the cam pin 48 is moved radially inwardly due to the radial fall of the cam and by the force exercised by the deflected diaphragm 15 which tends to center the adapter 18. As a result, the tool point 31 retracts radially with a corresponding increment. Sidewise and axial movement are again prevented by the pins 21 and abutting face surfaces of the retainer 19 and the adapter 18.

The boring quill of the present invention has a number of adantages. Retraction and extension of the cutting tool is readily and precisely accomplished by moving the operating bar axially inwardly or outwardly. This may be done semi-automatically or even automatically. The action of the diaphragm provides movement of the adapter and tool holder which is precise and which, although it offers flexibility of movement of the tool holder, still retains the tool holder in a fixed extended position for operation, and readily provides a spring-biased force to retain the tool holder in a normally retracted position. Tool wear compensation may be provided by rotating the operating bar. However, according to an improved structure as provided herein the manual adjustment dial operating through the spur gears results in the rotation of the barrel-type cam, permitting a higher precision adjustment of the operating position of the tool when compensating for wear of the tool. Operation of the quill is highly reliable and relatively little maintenance is required over extended periods of time.

While but only one form of the invention has been shown and described, other forms will now be apparent to those skilled in the art. Therefore, the embodiment shown in the drawings is merely for illustrative purposes, and is not intended to limit the spirit and scope of the invention as above described and illustrated in the drawings.

The embodiments of the invention in which an exclusive property or privilege is claimed are defined as follows:

1. A boring quill adapted to be mounted on the spindle of a boring machine to provide retraction of the cutting tool mounted thereon and compensation adjustment for cutting tool wear, said quill comprising:
  a. a cylindrical housing having an axial chamber provided therein,
  b. a circular sheet-form resilient diaphragm mounted in said chamber and affixed at its periphery to said housing,
  c. an adapter for supporting a tool holder, said adapter being mounted at a central portion of the outer surface of said diaphragm,
  d. a retainer having a radial wall and an axial wall mounted with said radial wall engaging a central portion of the inner surface of said diaphragm, said adapter and said retainer being affixed to each other and clamping said diaphragm therebetween, said diaphragm pivotally supporting said adapter and said retainer and biasing same to a central rest position,
  e. a cylindrical cam chamber provided in said housing
  f. a barrel-type cam mounted within said cam chamber arranged to move both axially and rotatably therein, the surface of said cam having both an axial rise and a radial rise,
  g. cam follower means mounted in a radial channel provided in said housing having one end engaging said cam and the other end engaging the inner surface of the axial wall of said retainer, and
  h. means for moving said cam both axially and radially comprising an operating bar having one end affixed to said cam and the other end externally positioned,
whereby moving said operating bar axially causes a cutting tool mounted in said adapter to retract and extend, and rotating said operating bar changes the extended position of said cutting tool to compensate for wear thereof.

2. A boring quill according to claim 1, wherein said cam follower means is a cylindrical pin slidably mounted in a radial channel provided in said housing.

3. A boring quill adapted to be mounted on the spindle of a boring machine to provide retraction of the cutting tool mounted thereon and compensation adjustment fur cutting tool wear, said quill comprising:
  a. a cylindrical housing having an axial chamber provided therein,
  b. a circular sheet-form resilient diaphragm mounted in said chamber and affixed at its periphery to said housing,
  an adapter for supporting a tool holder, said adapter being mounted at a central portion of the outer surface of said diaphragm,
  d. a retainer having a radial wall and an axial wall mounted with said radial wall engaging a central portion of the inner surface of said diaphragm, said adapter and said retainer being affixed to each other and clamping said diaphragm therebetween, said diaphragm pivotally supporting said adapter and said retainer and biasing same to a central rest position,
  e. a cylindrical cam chamber provided in said housing,
  f. a barrel-type cam mounted within said cam chamber arranged to move both axially and rotatably therein, the surface of said cam having both an axial rise and a radial rise,
  g. cam follower means mounted in a radial channel provided in said housing having one end engaging said cam and the other end engaging the inner surface of the axial wall of said retainer,
  h. means for moving said cam axially comprising an operating bar having one end connected to said cam and the other end extending externally, and
  i. means for rotating said cam comprising:
    1. a first spur gear affixed to one end of said cam,
    2. a shaft rotatably mounted in a channel provided in said housing,
    3. a second spur gear mounted on said shaft and rotatably fixed with respect thereto, said first and second spur gears being in meshed engagement, and
    4. a maual adjustment dial affixed to an external end of said shaft,
whereby moving said operating bar axially causes a cutting tool mounted in said adapter to retract and extend, and rotating said manual adjustment dial changes the extended position of said cutting tool to compensate for wear thereof.

4. A boring quill according to claim 3, wherein said retainer is substantially cup-form and wherein a portion of the axial wall thereof is recessed to clear said gears.

5. A boring quill according to claim 3, wherein said cam follower means is a cylindrical pin slidably mounted in a radial channel provided in said housing.

6. A boring quill according to claim 5, wherein said pin is provided with a flat recess and means is disposed in said recess engaging the flat surface thereof to prevent said pin from rotating.

7. A boring quill according to claim 6, wherein said means preventing said pin from rotating is a roll pin.

8. A boring quill according to claim 4, wherein said retainer is pivotally restrained on a pair of pins coaxially mounted in said housing, said pins each having an end bearing into the surface of the external axial wall of said retainer.

9. A boring quill according to claim 3, wherein one end of said cam is provided with an axial engaging channel of noncircular cross-secion and the engaging end of said operating rod has a complementary cross-section and disposed within the engaging channel of said cam, whereby rotation of said operating rod causes said cam to rotate.

10. A boring quill according to claim 3, wherein a spring is mounted over said operating rod biasing it outwardly to the operating position.

11. A boring quill according to claim 3, wherein said manual adjustment dial is provided with a calibrated scale.

* * * * *

UNITED STATES PATENT OFFICE
CERTIFICATE OF CORRECTION

Patent No. 3,744,924       Dated July 10, 1973

Inventor(s) GEORGE J. LEVOSINSKI, ET. AL.

It is certified that error appears in the above-identified patent and that said Letters Patent are hereby corrected as shown below:

On the cover sheet [75], "Joseph Mitkiewicz" should read -- Joseph Nitkiewicz -- .

Signed and sealed this 22nd day of January 1974.

(SEAL)
Attest:

EDWARD M. FLETCHER, JR.
Attesting Officer

RENE D. TEGTMEYER
Acting Commissioner of Patents